US012037846B2

(12) United States Patent
Buzek et al.

(10) Patent No.: US 12,037,846 B2
(45) Date of Patent: Jul. 16, 2024

(54) COMBINATION SCREEN, STORM AND EXTERIOR ENTRY DOOR WITH INSERT

(71) Applicants: Brandon Scot Buzek, Jasper, GA (US); Stacy Layne, Calhoun, GA (US)

(72) Inventors: Brandon Scot Buzek, Jasper, GA (US); Stacy Layne, Calhoun, GA (US)

( * ) Notice: Subject to any disclaimer, the term of this patent is extended or adjusted under 35 U.S.C. 154(b) by 0 days.

(21) Appl. No.: 15/385,298

(22) Filed: Dec. 20, 2016

(65) Prior Publication Data

US 2017/0260798 A1 Sep. 14, 2017

Related U.S. Application Data

(60) Provisional application No. 62/270,294, filed on Dec. 21, 2015.

(51) Int. Cl.

| | |
|---|---|
| ***E06B 9/54*** | (2006.01) |
| ***E06B 7/30*** | (2006.01) |
| ***E06B 9/264*** | (2006.01) |

(52) U.S. Cl.

CPC .................. *E06B 9/54* (2013.01); *E06B 7/30* (2013.01); *E06B 9/264* (2013.01); *E06B 2009/2643* (2013.01)

(58) Field of Classification Search

CPC ... E06B 5/003; E06B 7/02; E06B 9/54; E06B 2009/527; E06B 3/5892; E06B 3/645; E06B 2003/7011

See application file for complete search history.

(56) References Cited

U.S. PATENT DOCUMENTS 1,100,564 A * 6/1914 Heryford .................. E06B 9/52 16/371
2,379,120 A * 6/1945 Turner ...................... E06B 9/54 160/27
2,511,108 A * 6/1950 Hansen ................... E06B 5/003 160/90
3,244,222 A * 4/1966 Johnson .................. E06B 5/003 160/102
4,034,510 A * 7/1977 Huelsekopf ........... E05D 15/165 49/419
4,327,535 A * 5/1982 Governale ............ E06B 3/5892 52/204.593
5,307,599 A * 5/1994 Herbst .................... E06B 3/685 52/207
5,901,768 A * 5/1999 Herbst .................... E06B 5/003 160/90

(Continued)

OTHER PUBLICATIONS

Masonite 2009 Steel and Fiberglass Entry Door Catalog, retrieved from http://www.joneswd.com/pdf/Masonite%20Fiberglass,%20Steel.pdf (Year: 2009).*

(Continued)

*Primary Examiner* — Abe Massad

(74) *Attorney, Agent, or Firm* — Meunier Carlin & Curfman LLC

(57) ABSTRACT

The present invention discloses a door, preferably an exterior or entry door that swings outwardly, with a modular insert including movable screening and a glass panel that allows for seasonal use of the door and ready replacement of existing doors that have a standard glass insert or retrofitting of a door that has no insert at all.

9 Claims, 3 Drawing Sheets

(56) References Cited

U.S. PATENT DOCUMENTS

| | | | | |
|---|---|---|---|---|
| 6,167,936 | B1 * | 1/2001 | Stover | E06B 9/54 160/100 |
| 6,192,631 | B1 * | 2/2001 | Kenkel | E06B 3/44 49/482.1 |
| D443,077 | S | 5/2001 | DeBlock | |
| 6,618,998 | B1 * | 9/2003 | Thomas | E06B 5/003 160/100 |
| 6,629,555 | B2 | 10/2003 | DeBlock et al. | |
| D490,910 | S | 6/2004 | Alexander | |
| D493,003 | S | 7/2004 | Alexander | |
| 6,769,214 | B1 * | 8/2004 | Kenkel | E06B 5/003 49/436 |
| 6,817,401 | B2 | 11/2004 | Sun et al. | |
| D502,552 | S | 3/2005 | Alexander | |
| D559,407 | S | 1/2008 | Dorris | |
| D559,408 | S | 1/2008 | Dorris | |
| 8,733,041 | B2 * | 5/2014 | Phipps | E06B 3/5892 52/204.591 |
| 8,944,531 | B2 | 2/2015 | Wyman et al. | |
| 2005/0022943 | A1 * | 2/2005 | Thomas | E06B 9/08 160/27 |
| 2008/0264573 | A1 * | 10/2008 | Beck | E06B 5/003 160/95 |
| 2008/0283204 | A1 * | 11/2008 | Beck | E06B 5/003 160/239 |
| 2009/0165415 | A1 * | 7/2009 | Salerno | E06B 3/72 52/745.15 |
| 2010/0229468 | A1 * | 9/2010 | Allen | E06B 9/40 49/171 |
| 2012/0137589 | A1 * | 6/2012 | Christie | E06B 7/04 49/168 |
| 2016/0222720 | A1 * | 8/2016 | Tamberino | E06B 9/0692 |

OTHER PUBLICATIONS

Masonite 2014 Exterior Glass Catalog, retrieved from https://www.dashwood.com/wp-content/uploads/2014/04/Masonite.pdf (Year: 2014).*

SWS Venting Glass Units and corresponding archived webpage, retrieved from http://www.swscorp.net/SWS_products/exterior_door/Venting%20Glass%20Units.html and https://web.archive.org/web/20150611050719/http://www.swscorp.net/SWS_products/exterior_door/Venting%20Glass%20Units.html (Year: 2015).*

* cited by examiner

COMBINATION SCREEN, STORM AND EXTERIOR ENTRY DOOR WITH INSERT

CROSS-REFERENCE TO RELATED APPLICATIONS

This application claims the benefit of U.S. Provisional Application No. 62/270,294, filed Dec. 21, 2015, which is incorporated herein by reference in its entirety.

FIELD OF INVENTION

This invention relates to doors, and more particularly entry or exterior doors where it is desired to have a single door that includes an insert that is capable of allowing ambient air flow past the door.

BACKGROUND

It is known to provide an inward opening exterior door with an exterior storm or screen door to provide a cased opening that allows for the passage of light and air. In such a conventional arrangement, the storm door is positioned to the exterior of the entry door, and is hinged along the hanging stile of the door to the same jam as the entry door. The storm door is typically lighter in weight than the entry door, and maybe made of any suitable material, including aluminum, wood or vinyl. The entry door, is typically more substantial conventionally having a greater depth. For example, standard entry door depth is one and three-quarter inches (1¾") whereas a standard storm door may be one inch (1") or less. Of course, both storm doors and entry doors are sized to fit conventional opening of thirty-six inches (36") by eighty inches (80").

Moreover, storm doors are known to incorporate panes of glass or screens or both. Some storm doors including screens that are conventionally and fixedly mounted to the storm door frame to cover an opening in the storm door. Other storm doors include glass panes that are similarly fixedly mounted to the storm door frame. Still other storm doors are known with screens that a fixed to the frame with a sliding glass pane. With such doors, the panes can typically be secured or supposed into a plurality of positions depending on the user's preference. In warmer times, the glass pane is opened to the greatest extent possible to allow for maximum audient air flow past the storm door. A user may desire to open any associated entry door in an inward direction so that ambient air is introduced to the interior of a structure. In cooler times, the glass pane is closed to preclude cold air from passing through the opening, and in conjunction with the entry door, thereby prevent cold air from entering the interior of the structure.

It is further known to provide an entry door with a decorative glass insert. In such an arrangement, the entry door is fitted with an insert of glass that may range in size to that desired by the user. For example, known insert sizes for a standard door include:

$$27\frac{9''}{16}\times 68\frac{5''}{16} \quad (a)$$

$$9\frac{5''}{16}\times 67\frac{3''}{16} \quad (b)$$

$$27\frac{9''}{16}\times 53\frac{1''}{16} \quad (c)$$

-continued $$27\frac{1''}{8}\times 44\frac{1''}{8} \quad (d)$$

$$25''\times 17\frac{1''}{2} \quad (e)$$

$$8''\times 36'' \quad (f)$$

$$7''\times 64'' \quad (g)$$

$$20''\times 36'' \quad (h)$$

$$22''\times 36'' \quad (i)$$

$$20''\times 64'' \quad (j)$$

$$22''\times 64'' \quad (k)$$

The foregoing sizes may be modified to fit a particular end use, and customized as desired. The inserts are conventionally provided with hardware such as screws or clips or both that allow the inserts to be removed from the door frame and replaced or reinserted.

Many people find a storm door to be unattractive or aesthetically detracts from an entry door. Thus, particularly in warmer climates, many people choose not to use a storm door and, instead prefer a single entry door. However, it is also known to desire the benefits of a storm door or the benefits of a storm door with a screen/glass panel arrangement. Such benefits can be particularly desirable in certain climates where it is appropriate or necessary for an entry door to swing open to the outside. For example, it is recognized, and required in many coastal, hurricane prone areas that an entry door must swing to the outside. Such a requirement effectively forecloses any use of an exterior storm door. For many, such an arrangement likewise precludes the use of any exterior screen door or screen and glass panel door.

Thus, there is a need in the prior art that allows for a replaceable insert that can allow for air flow used maintain interior temperature coordinates for use with entry doors, particularly entry doors that swing outwards.

SUMMARY OF INVENTION

The present invention addresses the above-described and other needs in the prior art by providing a combination screen, storm and exterior door with an insert. This summary is provided to introduce certain concepts, to identify certain examples, and not necessarily to address all embodiments in accordance with the description of the invention herein and below. The description of exemplary embodiments is not intended to limit the scope of the invention as set forth in the claims.

More particularly, the present invention may be described in multiple embodiments, one of which includes an insert with a retractable screen and glass panel combination suitable for retention within a standard, outward opening entry or exterior door. Thus, in one embodiment, the present invention is able to provide a single exterior door that may include the flexibility of storm door type features in an outwardly opening door. In another embodiment, the present invention further provides a door insert that can be installed and removed easily. A preferred door is constructed to fit in a standard interior or exterior doorway without modifications to the jambs, threshold or header. In another embodiment, a preferred insert can be retrofitted to an existing door for said doorway, even if the door did not already provide an insert. A preferred insert can also be a replacement for a door that already included an insert. Further, in yet another embodiment, a preferred insert includes a retractable screened opening and glass panel to allow air flow or to seal the door, particularly if the entry door is to be an outswing door.

Other aspects, features and advantages will be apparent from a review of the detailed description in conjunction with the accompanying drawings.

DETAILED DESCRIPTION

Before embodiments of the present disclosure are described in detail, it is to be understood that the apparatus, methods and systems are not limited to specific methods, specific components, specific feature, specific systems or particular compositions. The terminology used herein is for the purpose of describing particular embodiments only and is not intended to be, and is not, limiting. The term "exemplary" means "an example" or an "example of" and is not meant to convey a meaning of an ideal or a preferred embodiment or feature. The term "such as" is merely explanatory and indicative that any recited items are examples of what is covered by a stated feature or provision; it is not intended to restrict or to be restrictive.

Further, this disclosure is of components and features that can be used to perform the disclosed methods, apparatus or systems. When combinations, subsets, interactions, groups, etc. of such components are disclosed, even when reference is not explicitly made to all possible combinations or permutations, each is contemplated and described for all methods, apparatus and systems. This applies to all aspects of the disclosed invention, including method steps. Thus, if additional steps may be performed, it is understood that such additional steps may be performed with a specific disclosed embodiment or combination of embodiments.

Figure 1:
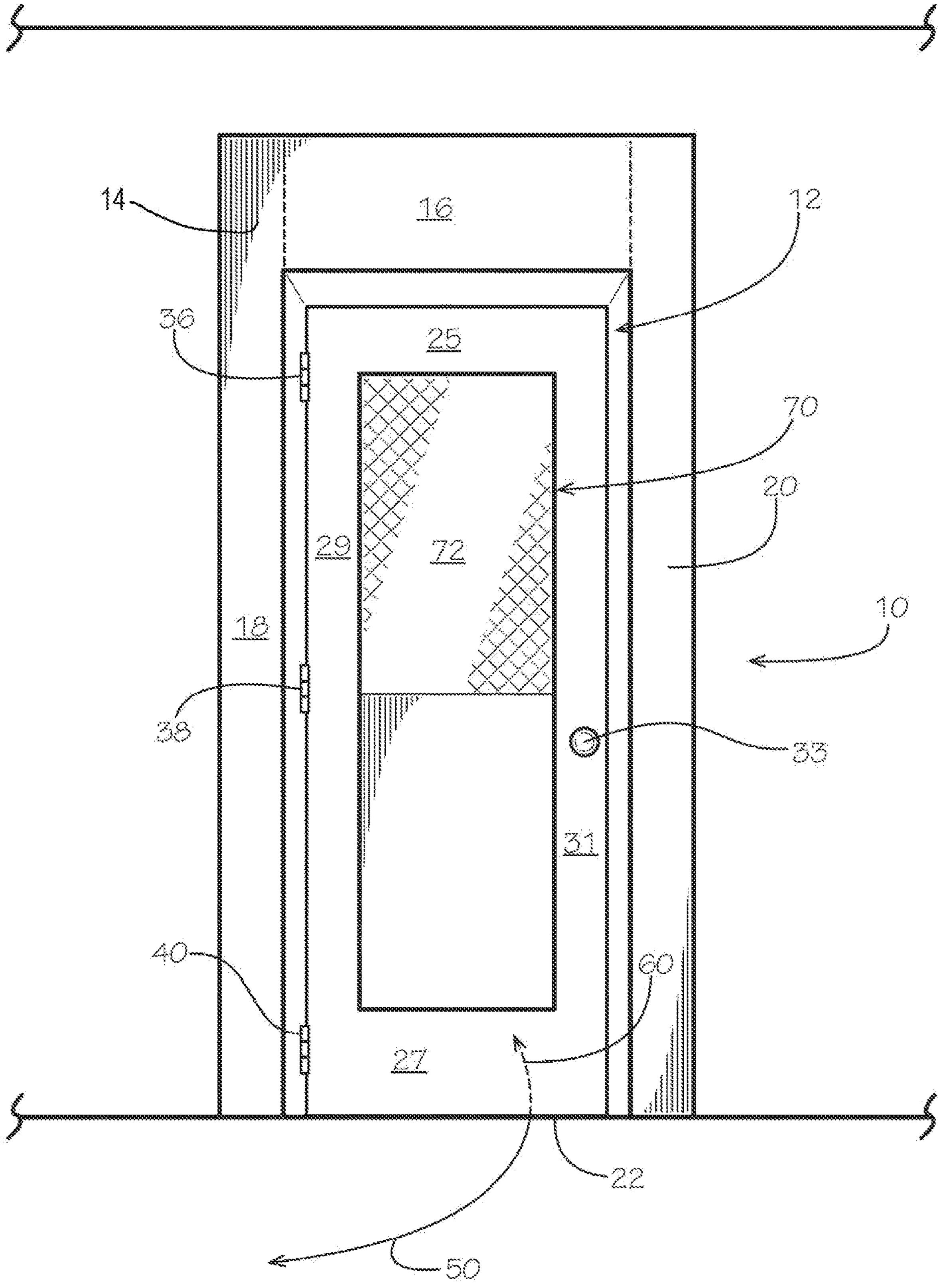
FIG. 1 is a front plan and perspective, illustration showing a door and an insert capable of embodying the present invention.

FIG. 1 shows a standard exterior door in accordance with the present invention generally at 10. The door 12 is mounted in a frame indicated generally at 14. The frame 14 includes a heading 16, a hinge jamb 18, a latch jamb 20 and a threshold 22. The door 12 includes a top rail 25, a bottom rail 27, a hanging stile 29 and a latch stile 31. A door knob 33 is provided in the latch stile 31 that may include and cooperate with a latch/lock set as is known in the art. It will be appreciated that the door 12 is hung upon three hinges 36, 38 and 40 that are secured and operate as also known in the art. Further, the exterior door 12 is oriented so as to swing in an outward manner, as shown by the arrow 50. It should be understood that the door 12 may be constructed so as to "open" or "swing" in any desired manner, including in an inward direction as represented by the dotted line arrow 60 as shown in FIG. 1. The person of ordinary skill in the art will appreciate that the present invention may be embodied in multiple door constructions, including, sliding doors, pocket doors, etc.

Yet further, the door 12 includes an insert indicated generally at 70, which includes a glass panel 72. The insert 70 is described in greater detail below, but the person of ordinary skill will recognize that entry or exterior doors with glass inserts are known in the art and conventionally used with or without a storm door (not shown). If a storm door is present, the door 12 necessarily opens in an inward direction as represented by the arrow 60. The mere presence of the storm door, which rests to the exterior of the door 12, requires such an operation of the entry door 12. However, as noted above, there are instances where an exterior door is preferable constructed so as to open to the exterior as represented by arrow 50? In such an instance, it is impossible to provide a conventional storm door because it would preclude opening of the entry door 12. And, since the door 12 shown in FIG. 1 is without an opening, it is not possible to close the door 12 and receive any ambient air flow from the exterior of the structure that includes the door 12.

Figure 2:
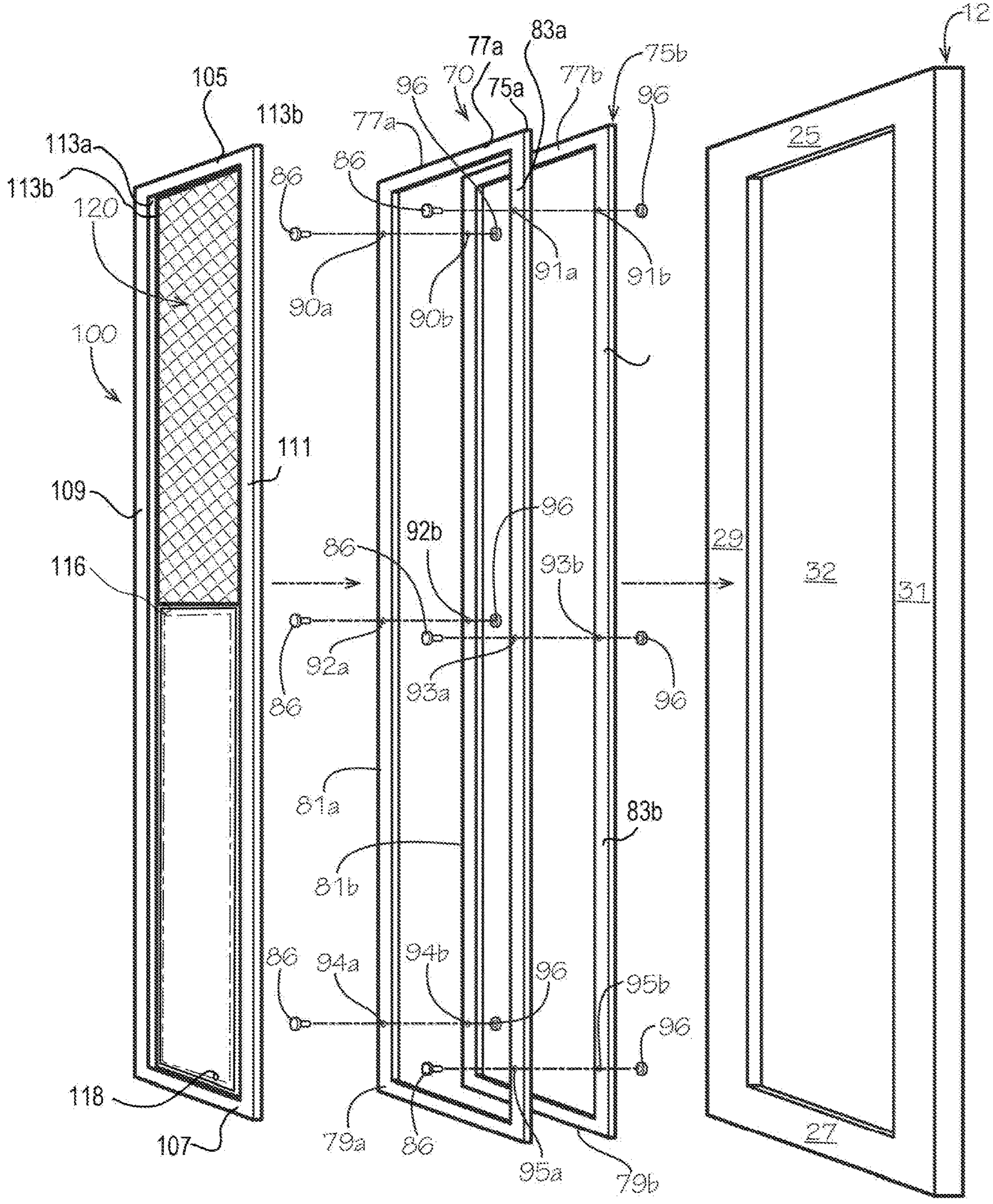
FIG. 2 is a perspective view showing an exterior door in accordance with the present invention.

FIG. 2 similarly show a door 12, with frame elements of a top rail 25, a bottom rail 27, a hanging rail 29 and a latch rail 31. It will be appreciated that standard door dimension such as 36×80 may be utilized for provision of the door 12. Further, a standard door depth of one and three-quarter inches (1¾") may be used for the door 12. As shown, the door 12 is a sufficient depth to receive an insert, indicated generally at 70. The insert 70 include two substantially identical frame members 75*a* and 75*b*, each of which include respective top rails 77*a* and 77*b*, bottom rails 79*a* and 79*b*, a side rail 81*a* and 81*b*, and an opposing side rail 83*a* and 83*b*. The frame elements 75*a* and 75*b* are secured matingly one to the other by a plurality of fasteners 86 that engage securing elements 88. The fasteners 86 may comprise bolts and/or screws that extend through openings frame 90*a* and 90*b*, 91*a* and 91*b*, 92*a* and 92*b*, 93*a* and 93*b*, 94*a* and 94*b* and 95*a* and 95*b* to engage respective nuts 96.

The present invention illustrated in FIG. 2 further includes an insert member 100. As shown, the insert member 100 is configured to be received by and between insert frame members 75*a* and 75*b*. The fasteners 86 may engage the insert member 100 to maintain its position, as described in more detail below. The insert member 100 includes frame members including a top rail 105, a bottom rail 107, a side rail 109 and an opposing side rail 111. The frame members support at least two respective channels 113*a* and 113*b* in side rails 109 and 111. The channels receive a pair of glass panels 116 and 118. As shown in FIG. 2, glass panels 116 and 118 are side-by-side, immediately one behind the other. The insert member 100 further includes a screened portion 120. It will be appreciated that panel 118 may slid vertically to cover the screening 120 so as to provide a glass front such that glass panel 118 rests at the top of the insert 100. It is to be understood that the insert frame members such as 105, 107, 109 and 111 may include apertures for receipt of a fastener 86 to support the insert 100 in the opening defined in the door 12, between the frame members 75*a* and 75*b*. In fact, such openings may be threaded so as to thread-ably engage the fasteners 86. Alternatively, the door 12 may be constructed or configured to receive and support the insert within the opening without using the fasteners 86. A friction fit, or separate and distinct fasteners, may be used as desired. The person of ordinary skill in the art will appreciate that there are many different and varied ways of mounting and maintaining the insert 100 within the door 12 that are within the spirt and scope of the present invention.

Figure 3:
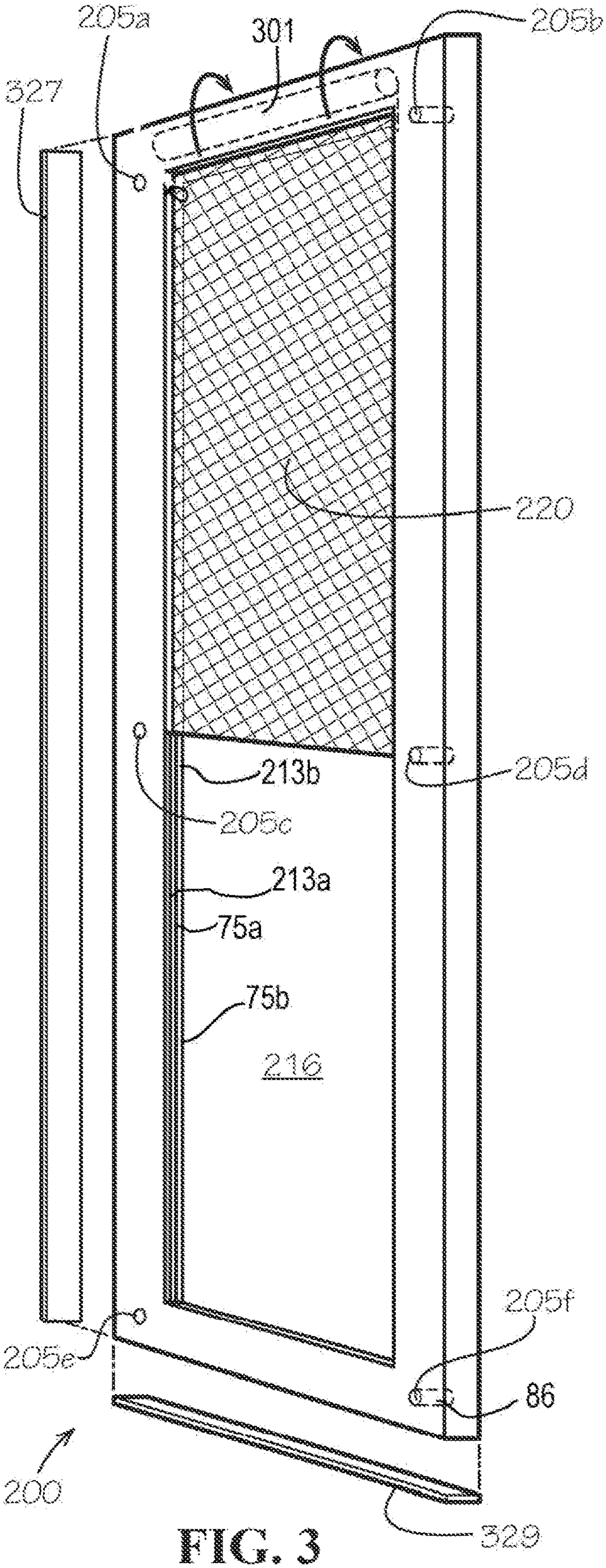
FIG. 3 is a perspective view showing an insert in accordance with the present invention.
Figure 3A:
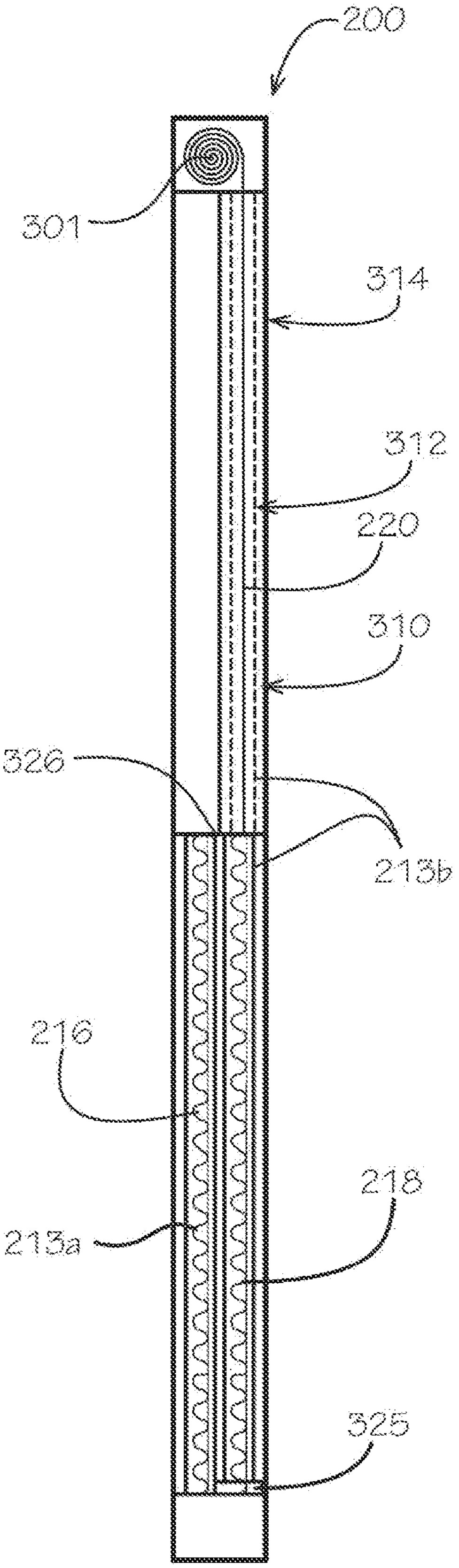
FIG. 3*a* is a side view showing an insert in accordance with the present invention.

FIG. 3 shows an embodiment of an insert 200 in accordance with the present invention. In this embodiment, the insert 200 includes a series of apertures 205*a*, 205*b*, 205*c*,

205*d*, 205*e*, and 205*f* that are configured and located to be engaged by fasteners 86 so as to secure and retain the insert 200 within the frame members 75*a* and 75*b*. It will be appreciated that the apertures 205*a*-205*f* may be threaded so as to engage the fasteners 86, if so desired. It will be appreciated that the insert 200 includes a lower glass panel 216, a second glass panel 218 and a screen 220, as shown in FIGS. 3 and 3*a*. Referring in more detail to FIG. 3*a*, the insert 200 includes a first an opposing pair of channels 213*a* and a second opposing pair of channels 213*b* positioned on opposite inner side walls of the insert 200. The pair of channels 213*a* and 213*b* are essentially identical, and thus only one is described in detail herein. The opposing set of channels 213*a* are configured to extend along and located in the lower front portion of the insert 200. The channels 213*a* define side rails that receive the glass panel 216, which as shown in FIG. 3 sits to the front side of the insert 200. The second opposing set of channels 213*b* are configured to extend along and located across the entire opposing inner side walls of the insert 200. The channels 213*b* define side rails that receive and facilitate slid able movement of the glass panel 218, which as shown in FIG. 3 sits to the rear or interior side of the insert 200.

The screen 220 is secured about a tractable, biased rotating roller 301 that is secured within the upper rail portion of the insert 200. While not necessary from a functional standpoint, the roller 301 and associated screen 220 may thus be hidden from view for aesthetic reasons. The screen 220 may be biased about the roller 301 in a shade-like manner so as to be urged into a withdrawn position such that, if left to its own devices, the screen 220 would be fully withdrawn and remain withdrawn (and fully maintained about the roller 301) into the top rail of the insert 200. Such biasing may be accomplished by a known winding mechanism (not shown) or any other suitable mechanism known to the person of ordinary skill in the art. The distal end of the screen 220 is attached to the uppermost portion of the glass panel 218 that rests within the opposing set of channels 213*b*. The method of attachment may be by glue, fasteners, or any other suitable device, and would preferably be accomplished in such a manner as to insure that there is no gap or opening between the screen material 220 and the top of the panel 218. As a result, movement of the glass panel 218 within its respective side rails as defined by opposing channels 213*b* will result in a corresponding movement of the screen 220. If the glass panel 218 is lowered to its lowermost position, as shown in FIG. 3, the screen 220 is extended to its maximum position and, as such, a screened opening is provided through which ambient air can pass the insert 200 into a dwelling secured by a door 12. Alternatively, if the glass panel 218 is moved within its side rails to its uppermost position, the opening defined by the insert 200 is fully closed by means of the glass panels 216 and 218, and the screen 220 is withdrawn about the roller 301 within the upper rail of the insert 200. It will be appreciated that regardless of its position, the biasing of the screen 220 about the roller 301 allows for the screen to be fully engaged with and extended to meet the top surface of glass panel 218. Thus, the screen could be secured by a latch, detent or other mechanism (not shown) at discrete positions along the opposing channels 213*b*, shown by way of example at points 310, 312 or 314, which would progressively reduce the size of the screen opening in the insert 200 in accordance with a user's preference.

It will further be appreciated that the glass panels 216 and 218 may be fitted with weatherproofing material or the like in order to provide a greater level of protection to the interior of a dwelling or other structure. For example, the base of the glass panel 218 may be fitted with a weather proofing strips of material 325 and 326. Such a weather proofing (or water proofing) material may be cloth, rubber, polyvinyl chloride, silicone, or any like or suitable material that is effective to weatherize the opening. For example, the weatherproofing material 325 would be effective to preclude the introduction of air or water or other undesired element that may seek to intrude between the top of panel 216 and the bottom of panel 218 when the inner panel 218 is raised to its uppermost position. Similarly, weather proofing strip of material 326 would be effective to preclude the introduction of air or water or other undesired element that may seek to intrude between the top of the panel 218 and the top rail of the insert 200 when the panel is at it uppermost position. Yet further, it will be appreciated that the side, top and bottom surfaces of the insert 200 may be fitted with weather stripping material to similarly preclude the introduction of unwanted elements about the insert 200 as it is secure within the door 12. Two examples of such weather proofing materials portions are shown at 329 and 327 in FIG. 3. Such weatherstripping (or water proofing material) may be attached or secured in a suitable manner including by screws or other fasteners, glue, or any other suitable device.

Therefore, it is to be understood that the present invention is suitable for use in hurricane-prone areas and, accordingly, the insert 100 may be mounted with weather stripping placed about its periphery to insure a proper seal and protection, as is shown and described in more detail herein. The use and securing of weather stripping within and about a door is known to the person of ordinary skill, and known methods may be used in relation to the insert. A primary purpose of the door will be to withstand extreme wind, prevent intrusion of matter and debris, and to generally protect against storm damage. The fasteners 86 and weather stripping may therefore be selected to meet, and possible exceed, such conditions. Regardless, in typical non-storm related use and in extreme weather conditions, the present invention is suitable for use in an outward opening door 12 (see arrow 50), the glass panels 116 and 118 can be manipulated so as to for a substantially airtight barrier for cold weather (See FIG. 1) or provide an opening for ambient air (see FIG. 2). Such an arrangement and flexibility is well suited for those regions or areas where an outward opening door is required such as in hurricane prone areas where an outward opening exterior door may be required. Further, it is to be appreciated that the present invention is not limited to a particular size of door 12 or insert 100, as the teachings of the present disclosure are applicable to any size door and insert. Further, the teachings of the present disclosure are also applicable to a combination of doors, such as double entry (or "French") doors, and to door panels that may be fixed (sometimes in conjunction with another door).

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations may be depicted in the drawings in a particular order or arrangement, this should not be understood as requiring that such operations be performed in the particular order or arrangement shown or in any sequential order, or that all illustrated operations or arrangements be performed, to achieve desirable results. In certain circumstances, multitasking and parallel processing may be advantageous. Moreover, the separation of various system components in the implementations described above should not be understood as requiring such separation in all implementations, and it should be understood that the described components and systems may generally be integrated together in a single product or packaged into multiple products.

The invention claimed is:

1. An entry door configured with an opening, the entry door comprising:

two substantially identical mating frame members that secure to each other within the opening and connect to the entry door, each frame member defining frame apertures in respective side rails of each frame member;

an insert member secured substantially entirely between the two mating frame members, the insert member comprising:

an upper rail portion, a side rail, and an opposing side rail, wherein the side rail and the opposing side rail each comprise a front side channel and an interior side channel;

insert apertures defined in the side rail and the opposing side rail;

fasteners extending through the insert apertures of the side rail and the opposing side rail of the insert member and through the frame apertures of each side rail of each frame member to secure and retain the insert member within the frame members;

a lower glass panel positioned for slidable movement within the front side channel;

a second glass panel positioned for a respective slidable movement within the interior side channel;

a screen secured about a rotating roller positioned within the upper rail portion of the insert member, wherein the screen is configured for extending from the roller and withdrawing onto the roller according to respective directions of rotation of the roller;

an attachment device connecting a distal end of the screen opposite the roller to the second glass panel, the attachment device moving the screen with the respective slidable movement of the second glass panel;

a plurality of detents positioned in each of the front side channel and the interior side channel; and latches engaging the detents to secure the screen at discrete positions;

wherein the side rail and the opposing side rail of the insert member each have a substantially constant depth along respective lengths thereof; and wherein each front side channel and each interior side channel, the lower glass panel, the second glass panel, the screen, and the rotating roller all are sized to have respective depths less than or equal to the depth of the side rails of the insert member, such that they are all substantially entirely positioned within the depth of the side rail and opposing side rail of the insert member in an assembled state.

2. The entry door according to claim 1, wherein the second glass panel comprises a respective uppermost portion and the attachment device connects the screen to the respective uppermost portion.

3. The entry door according to claim 1, wherein for the distal end of the screen connected to the second glass panel, the respective directions of rotation comprise clockwise rotation for extending the screen and counterclockwise rotation for withdrawing the screen around the roller.

4. The entry door according to claim 1, wherein the entry door comprises a depth from an exterior of the entry door to an interior side of the entry door, and wherein the insert member and the frame members are so dimensioned to fit within the depth.

5. The entry door according to claim 1, wherein the respective front side channel and the respective interior side channel extend along an entirety of inner side walls of the insert member.

6. The entry door according to claim 1, further comprising:

weatherproofing material connected to an uppermost portion and a base of the second glass panel;

additional weatherproofing material connected to a respective uppermost portion of the lower glass panel.

7. The entry door of claim 1, wherein the insert member is a modular insert member.

8. The entry door of claim 1, wherein the two frame members are identical.

9. The entry door of claim 1, wherein each of the two frame members comprises a frame member top rail and a frame member bottom rail.

* * * * *